United States Patent
Jia et al.

(10) Patent No.: US 11,784,689 B2
(45) Date of Patent: Oct. 10, 2023

(54) BEAM TRAINING METHOD, COMMUNICATION DEVICE, CHIP SYSTEM, AND STORAGE MEDIUM

(71) Applicant: HUAWEI TECHNOLOGIES CO., LTD., Shenzhen (CN)

(72) Inventors: Qiong Jia, Shanghai (CN); Jun Luo, Kista (SE); Ji Wu, Shanghai (CN); Yingpei Lin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 733 days.

(21) Appl. No.: 16/457,804

(22) Filed: Jun. 28, 2019

(65) Prior Publication Data
US 2019/0326968 A1    Oct. 24, 2019

Related U.S. Application Data

(63) Continuation of application No. PCT/CN2017/117971, filed on Dec. 22, 2017.

(30) Foreign Application Priority Data

Dec. 30, 2016 (CN) .......................... 201611264555.2

(51) Int. Cl.
*H04B 7/06* (2006.01)
*H04W 74/00* (2009.01)
*H04W 74/08* (2009.01)

(52) U.S. Cl.
CPC ........ *H04B 7/0613* (2013.01); *H04W 74/006* (2013.01); *H04W 74/0808* (2013.01)

(58) Field of Classification Search
CPC ............. H04W 74/006; H04W 72/046; H04W 74/0808; H04B 7/0695; H04B 7/088; H04B 7/0613
See application file for complete search history.

(56) References Cited

U.S. PATENT DOCUMENTS 9,414,285 B2 * 8/2016 Hampel ................ H04W 36/24
10,531,488 B2 * 1/2020 Park ........................ H04B 7/04
(Continued)

FOREIGN PATENT DOCUMENTS

| CN | 1878421 A | 12/2006 |
|---|---|---|
| CN | 102404035 A | 4/2012 |

(Continued)

OTHER PUBLICATIONS

R1-1609139 Samsung,"Overview of NR Unlicensed and Shared Spectrums",3GPP TSG RAN WG1 Meeting #86bis, Lisbon, Portugal Oct. 10-14, 2016,total 4 pages.
(Continued)

*Primary Examiner* — Mehmood B. Khan
(74) *Attorney, Agent, or Firm* — HAUPTMAN HAM, LLP

(57) ABSTRACT

This application discloses a beam training method, a communication device, a chip system, and a storage medium. The method includes: performing, by a transmit device, clear channel assessment on sectors corresponding to an antenna of the transmit device; and sending, by the transmit device in a sector whose result of clear channel assessment is idle, a training signal to a receive device, where the training signal is used to perform beamforming training on the antenna. With this solution, beamforming training efficiency can be improved and resource utilization can be increased.

20 Claims, 10 Drawing Sheets

(56) References Cited

U.S. PATENT DOCUMENTS

| | | | |
|---|---|---|---|
| 11,070,263 B2* | 7/2021 | Li | H04B 7/0617 |
| 2010/0159845 A1 | 6/2010 | Kaaja et al. | |
| 2010/0265922 A1* | 10/2010 | Bracha | H04W 74/0808 370/336 |
| 2015/0382268 A1 | 12/2015 | Hampel et al. | |
| 2016/0174206 A1* | 6/2016 | Xia | H04W 16/28 370/329 |
| 2017/0033851 A1 | 2/2017 | Zhong et al. | |
| 2017/0033854 A1 | 2/2017 | Yoo | |
| 2017/0295595 A1* | 10/2017 | Yang | H04W 74/0816 |
| 2017/0325222 A1* | 11/2017 | Cariou | H04W 72/0446 |
| 2018/0070353 A1* | 3/2018 | Yang | H04W 74/0808 |
| 2021/0235353 A1* | 7/2021 | Jung | H04W 36/305 |

FOREIGN PATENT DOCUMENTS

| | | | | |
|---|---|---|---|---|
| CN | 103650565 A | | 3/2014 | |
| CN | 104734759 A | | 6/2015 | |
| CN | 105814808 A | | 7/2016 | |
| CN | 110366872 A | * | 10/2019 | H04B 7/0408 |
| CN | 113518432 A | * | 10/2021 | |
| EP | 2838218 A1 | | 2/2015 | |
| EP | 2422402 B1 | | 7/2019 | |
| WO | 2011135099 A1 | | 11/2011 | |
| WO | 2015006537 A2 | | 1/2015 | |
| WO | WO-2015006537 A2 | * | 1/2015 | H04B 7/0417 |
| WO | 2015156575 A1 | | 10/2015 | |
| WO | WO-2016064169 A2 | * | 4/2016 | H04B 7/0617 |
| WO | 2016078565 A1 | | 5/2016 | |
| WO | 2016145615 A1 | | 9/2016 | |
| WO | 2017067378 A1 | | 4/2017 | |

OTHER PUBLICATIONS

India Examination Report issued in corresponding India Application No. 201937027695, dated Feb. 15, 2021, pp. 1-5, Intellectual Property India, Kolkata, India.

Luo Jun et al., Considerations on CCA for OBSS Opearation in 802.11ax. IEEE 802.11-14/1225r1, Sep. 11, 2014, 8 pages.

European Office Action issued in corresponding European Application No. 17887180.2, dated Dec. 20, 2021, pp. 1-9.

* cited by examiner

| Frame control Frame Control | Duration Duration | Receive antenna RA | Transmit antenna TA | Sector sweep SSW | Sector sweep feedback SSW feedback | Frame check sequence FCS |
|---|---|---|---|---|---|---|
| 2 | 2 | 6 | 6 | 3 | 3 | 4 |

Octets
Octets

FIG. 1

| | B0 | B1 B9 | B10 B15 | B16 B17 | B18 B23 |
|---|---|---|---|---|---|
| | Direction Direction | Countdown Cdown | Sector identifier Sector ID | Antenna port identifier DMG Antenna ID | Receive sector sweep length RXSS length |
| Bits Bits | 1 | 9 | 6 | 2 | 6 |

FIG. 3

BEAM TRAINING METHOD, COMMUNICATION DEVICE, CHIP SYSTEM, AND STORAGE MEDIUM

CROSS-REFERENCE TO RELATED APPLICATIONS

This application is a continuation of International Application No. PCT/CN2017/117971, filed on Dec. 22, 2017, which claims priority to Chinese Patent Application No. 201611264555.2, filed on Dec. 30, 2016, The disclosures of the aforementioned applications are hereby incorporated by reference in their entireties.

TECHNICAL FIELD

This application relates to the field of wireless communications technologies, and in particular, to a beam training method, a communication device, a chip system, and a storage medium.

BACKGROUND

In a millimeter-wave spectrum service, beamforming is usually implemented by using a phased array antenna, to increase signal strength to perform directional transmission. Beamforming is a mechanism used by a receiver and a transmitter to perform link budgeting before communication. Beamforming training is a process in which a receiver and a transmitter each send a training signal and acknowledge that a best receive antenna and a best sending antenna are obtained. When beamforming training is performed on an unlicensed frequency band, clear channel assessment (CCA) needs to be performed first, and the beamforming training can be performed only after it is determined that a channel is idle. In some scenarios, especially in a high-frequency transmission scenario, when it is detected that a channel is occupied, in most cases, only some sectors/beams in antenna radiation ranges of the receiver and the transmitter are occupied. When it consumes a relatively long time to wait for an idle channel and beamforming training cannot be performed, a waste of some resources is caused.

SUMMARY

This application provides a beam training method, a communication device, a chip system, and a storage medium, so as to resolve a prior-art problem of relatively low resource utilization.

A first aspect of this application provides a beam training method, where a transmit device serves as an initiator of beamforming training, to perform transmit beamforming training on the transmit device. A specific process of performing transmit beamforming training by the transmit device is as follows.

The transmit device performs clear channel assessment on sectors corresponding to an antenna of the transmit device; and then the transmit device sends, in a sector whose result of clear channel assessment is idle, a training signal to a receive device, where the training signal is used to perform beamforming training on the antenna. Specifically, when performing clear channel assessment, the transmit device sequentially performs clear channel assessment on all the sectors corresponding to the antenna, so that each time the transmit device performs clear channel assessment on one sector, the transmit device may determine, based on a result of the clear channel assessment corresponding to the sector, whether the sector is an idle sector.

In some possible designs, after determining an idle sector, the transmit device sends, in the idle sector, a training signal to the receive device, to perform transmit beamforming training on the idle sector. The training signal sent in the idle sector may carry a first indicator bit, and the first indicator bit is used to indicate a sector identifier of the sector from which the training signal is sent. Alternatively, the training signal may carry a second indicator bit, and the second indicator bit is used to indicate a quantity of sectors in which no training signal has been sent among the sectors corresponding to the antenna. The quantity can indicate whether beam sweep on a sector corresponding to a channel of a specific frequency band has ended. For example, if the indicated quantity of sectors is 0, it means that beamforming training is completed in all the sectors. If the indicated quantity of sectors is not 0, it means that beamforming training is not completed in some sectors, in other words, sector sweep has not ended. The first indicator bit and the second indicator bit may be located in a control field of the training signal.

The quantity of sectors in which no training signal has been sent not only is indicated by adding the second indicator bit to the training signal, but also may be implemented through counting. Specifically, when a training signal is sent in a sector whose result of clear channel assessment is idle, the transmit device counts sectors in which no training signal has been sent among the sectors corresponding to the antenna. In other words, each time a training signal is sent in one idle sector, the transmit device counts once. The transmit device may count by using a counter.

In some possible designs, a moment at which a training signal is sent may be further defined based on whether a system has a fixed time domain structure. For example, one of the following items may be met when a training signal is sent:

if the system has a fixed time domain structure, a start sending moment at which a training signal is sent meets the following: when a training signal is sent in each first sector, the sending is based on a preset time domain structure and starts from a subframe boundary of a subframe currently used to send the training signal; or if the system does not have a fixed time domain structure, a training signal is sent when it is found, through directional CCA, that a sector status of a first sector is idle.

In some possible designs, when performing clear channel assessment, the transmit device may perform clear channel assessment on only sectors corresponding to the antenna, or may perform clear channel assessment on an omnidirectional channel corresponding to the antenna. Specifically, the following cases are mainly included:

Case 1: When performing clear channel assessment, the transmit device first performs clear channel assessment on an omnidirectional channel corresponding to the antenna.

If a result of the clear channel assessment on the omnidirectional channel corresponding to the antenna is busy, the transmit device switches to performing clear channel assessment on the sectors corresponding to the antenna.

Case 2: When performing clear channel assessment, the transmit device first performs clear channel assessment on the sectors corresponding to the antenna.

After duration of the clear channel assessment on the sectors corresponding to the antenna reaches preset duration, the transmit device switches from performing the clear channel assessment on the sectors corresponding to the antenna to performing clear channel assessment on an omnidirectional channel corresponding to the antenna.

When a result of the clear channel assessment on the omnidirectional channel is idle, the transmit device sends a training signal in a sector in which no training signal has been sent.

In case 2, when the transmit device switches from performing directional clear channel assessment to performing omnidirectional clear channel assessment and a result of the omnidirectional clear channel assessment is idle, a training signal needs to be sent to only sectors in which beam training is not completed. In this way, beam training efficiency is improved, a beamforming training mechanism is optimized, and a problem of relatively low resource utilization caused by unnecessary waiting is reduced.

Case 3: When performing clear channel assessment, the transmit device performs clear channel assessment on only the sectors corresponding to the antenna.

In case 1 and case 2, a clear channel assessment manner used by the transmit device is the foregoing alternate manner. For clear channel assessment that is performed alternately, duration of the clear channel assessment on the sectors corresponding to the antenna or duration of the clear channel assessment on the omnidirectional channel may be further set, or an alternating cycle of the clear channel assessment on the sectors corresponding to the antenna and the clear channel assessment on the omnidirectional channel may be further set. Optionally, a timer may be set for the clear channel assessment on the sectors corresponding to the antenna or the clear channel assessment on the omnidirectional channel. When duration of the clear channel assessment on the sectors corresponding to the antenna or duration of the clear channel assessment on the omnidirectional channel reaches a preset threshold, a clear channel assessment manner may be switched. The threshold may be a preset absolute constant value, or the threshold is set to total duration of transmit beam training on at least one sector, or the threshold is set to P units of duration, where P is a positive integer. A value range or a manner of taking a value of the threshold is not limited in this application.

For some specified frequency bands or a service with a relatively high priority, only a clear channel assessment manner in case 3 may be used. A specific manner may change with an application scenario, and is not limited in this embodiment of this application.

After the transmit device sends, in the idle sector, the training signal to the receive device, the receive device determines a best sector based on signal strength of the received training signal, and then generates feedback information, and feeds back the best sector to the transmit device by using the feedback information. The feedback information carries a sector identifier of a sector with best signal quality among the idle sector in which the training signal is sent. For ease of subsequent citation, the best sector fed back by the receive device may be referred to as a best sending sector of the transmit device. Correspondingly, the transmit device receives the feedback information from the receive device.

In some possible designs, the antenna of the transmit device corresponds to M sectors, an antenna of the receive device corresponds to N sectors, and receive beam training and/or receive beam refinement further need/needs to be performed on the receive device. Because a manner of sending/receiving a training signal by the transmit device and a manner of receiving/sending a training signal by the receive device may be predetermined, a beam training process of the receive device and a receiving training process of the transmit device may differ mainly in the following two scenarios:

Scenario 1: The transmit device performs channel assessment on the sectors corresponding to the antenna, to send a training signal, and the receive device performs clear channel assessment on an omnidirectional channel corresponding to the antenna of the receive device, to receive a the training signal.

In this way, after transmit training on the transmit device is completed, receive beam training and/or receive beam refinement may be further performed on the receive device. Specifically, the transmit device may perform clear channel assessment on the best sending sector. If the transmit device determines that a sector status of the best sending sector is idle, the transmit device sends a training signal in the best sending sector for N times, in other words, sends, in the sector with best transmitted signal quality, a training signal to N sectors, to perform receive beam training and/or receive beam refinement on the receive device.

Scenario 2: The transmit device performs clear channel assessment on the sectors corresponding to the antenna, to send a training signal, and the receive device performs clear channel assessment on sectors corresponding to the antenna of the receive device, to receive the training signal.

When receiving a training signal sent by the transmit device, the receive device also performs receiving training on the antenna of the receive device. Then, when feeding back the best sending sector of the transmit device, the receive device also performs transmit training on the receive device. Specifically, the transmit device sequentially sends, in each sector whose result of clear channel assessment is idle, a training signal to the N sectors, to perform transmit training on the transmit device and perform receiving training on the receive device. Then, the receive device sequentially sends, in each sector whose result of clear channel assessment is idle, a training signal to the M sectors corresponding to the antenna of the transmit device, and adds, to the training signal, a sector identifier of the best sending sector of the transmit device, to perform transmit training on the receive device and perform receiving training on the transmit device. Correspondingly, when the receive device performs transmit beam training, the transmit device receives, in the sectors corresponding to the antenna, the training signals sent by the receive device, and then uses a sector with best received signal quality as a best receive sector of the antenna of the transmit device, and determines a best sending sector of the receive device, and feeds back the best sending sector of the receive device to the receive device.

A second aspect of this application provides a communication device that has a function of performing the beam training method provided in the first aspect. The function may be implemented by hardware, or may be implemented by hardware by executing corresponding software. The hardware or the software includes one or more modules corresponding to the foregoing function. The module may be software and/or hardware.

In a possible design, a communication device 80 serving as a transmit device is used as an example below, and the communication device includes:

a processing module, configured to perform clear channel assessment on sectors corresponding to an antenna of the transmit device; and a transceiver module, configured to send, in a sector whose result of clear channel assessment performed by the processing module is idle, a training signal to a receive device, where the training signal is used to perform beamforming training on the antenna.

Optionally, before performing the clear channel assessment on the sectors corresponding to the antenna, the processing module is further configured to:

perform clear channel assessment on an omnidirectional channel corresponding to the antenna; and if a result of the clear channel assessment on the omnidirectional channel corresponding to the antenna is busy, perform the clear channel assessment on the sectors corresponding to the antenna.

Optionally, after duration of the clear channel assessment on the sectors corresponding to the antenna reaches preset duration, the processing module is further configured to:

switch from performing the clear channel assessment on the sectors corresponding to the antenna to performing clear channel assessment on an omnidirectional channel corresponding to the antenna; and when a result of the clear channel assessment on the omnidirectional channel is idle, the transceiver module is further configured to a training signal in a sector in which no training signal has been sent.

Optionally, a training signal sent in the idle sector carries a first indicator bit, and the first indicator bit is used to indicate a sector identifier of the sector from which the training signal is sent.

Optionally, the transceiver module is further configured to:

receive feedback information from the receive device, where the feedback information is generated by the receive device based on a received training signal, and the feedback information carries a sector identifier of a sector with best transmitted signal quality among sectors from which the training signal are sent.

Optionally, the processing module is further configured to:

when a training signal is sent in a sector whose result of clear channel assessment is idle, count sectors in which no training signal has been sent among the sectors corresponding to the antenna.

Optionally, a training signal sent in an idle sector carries a second indicator bit, and the second indicator bit is used to indicate a quantity of sectors in which no training signal has been sent among the sectors corresponding to the antenna.

Optionally, the processing module is specifically configured to:

sequentially perform clear channel assessment on all the sectors corresponding to the antenna.

Optionally, if the transmit device performs clear channel assessment on the sectors corresponding to the antenna, to send a training signal, and the receive device performs clear channel assessment on an omnidirectional channel corresponding to an antenna of the receive device, to receive the training signal, after sending the training signal to the receive device, the transceiver module is further configured to:

send, in the sector with best transmitted signal quality, a training signal to N sectors, to perform receive beam training or receive beam refinement on the receive device.

Optionally, if the transmit device performs clear channel assessment on the sectors corresponding to the antenna, to send a training signal, and the receive device performs clear channel assessment on sectors corresponding to the antenna of the receive device, to receive the training signal, the transceiver module is specifically configured to:

sequentially send, in each sector whose result of clear channel assessment is idle, a training signal to the N sectors.

Optionally, after the training signal is sent to the receive device, the processing module is further configured to:

receive, in the sectors corresponding to the antenna, a training signal from the receive device by using the transceiver module, and use a sector with best received signal quality as a best receive sector of the antenna of the transmit device.

In a possible design, the communication device comprises:

at least one processor, at least one memory, and at least one transceiver, where the memory is configured to store program code, and the processor is configured to invoke the program code in the memory, to perform the following operations:

performing clear channel assessment on sectors corresponding to an antenna of the transmit device; and sending, in a sector whose result of clear channel assessment is idle, a training signal to the receive device by using the transceiver, where the training signal is used to perform beamforming training on the antenna.

In a possible design, the communication device may include one or more processors and a communications unit. The one or more processors are configured to support the communication device in performing corresponding functions in the foregoing method. The communications unit is configured to support the communication device in communicating with other devices to implement sending and receiving functions.

Optionally, the communication device may further include one or more memories, and the memory is configured to be coupled to the processors, and store a program instruction and data that are necessary for the communication device. The one or more memories may be integrated with the processors, or may be independent of the processors. This is not limited in this application.

Alternatively, the communication device may be a communications chip that may be disposed in a terminal device or in a communication device on a network side. The communications unit may be an input/output circuit or interface of the communications chip.

Another aspect of this application provides a computer readable storage medium including an instruction. When the instruction runs on a computer, the computer is enabled to perform the methods in the foregoing aspects.

In comparison with the prior art, in the solution provided in this application, an idle sector can be identified by performing the clear channel assessment on the sectors corresponding to the antenna, and a training signal is sent in the idle sector. This avoids a prior-art problem that a waiting time is excessively long because a training signal can be sent only when a plurality of sectors of the antenna are all idle. In one aspect, because the idle sector can be detected in a timely manner, resource utilization is increased. In another aspect, because a training signal is preferentially sent in the idle sector when some sectors are occupied, beamforming training efficiency is improved.

BRIEF DESCRIPTION OF DRAWINGS

FIG. 2-1 is a schematic flowchart of performing transmit beam training by a transmit device according to an embodiment of this application;

FIG. 2-2 is another schematic flowchart of performing transmit beam training by a transmit device according to an embodiment of this application;

FIG. 3 is a schematic structural diagram of an SSW field in a training signal according to an embodiment of this application;

DESCRIPTION OF EMBODIMENTS

Figure 2:
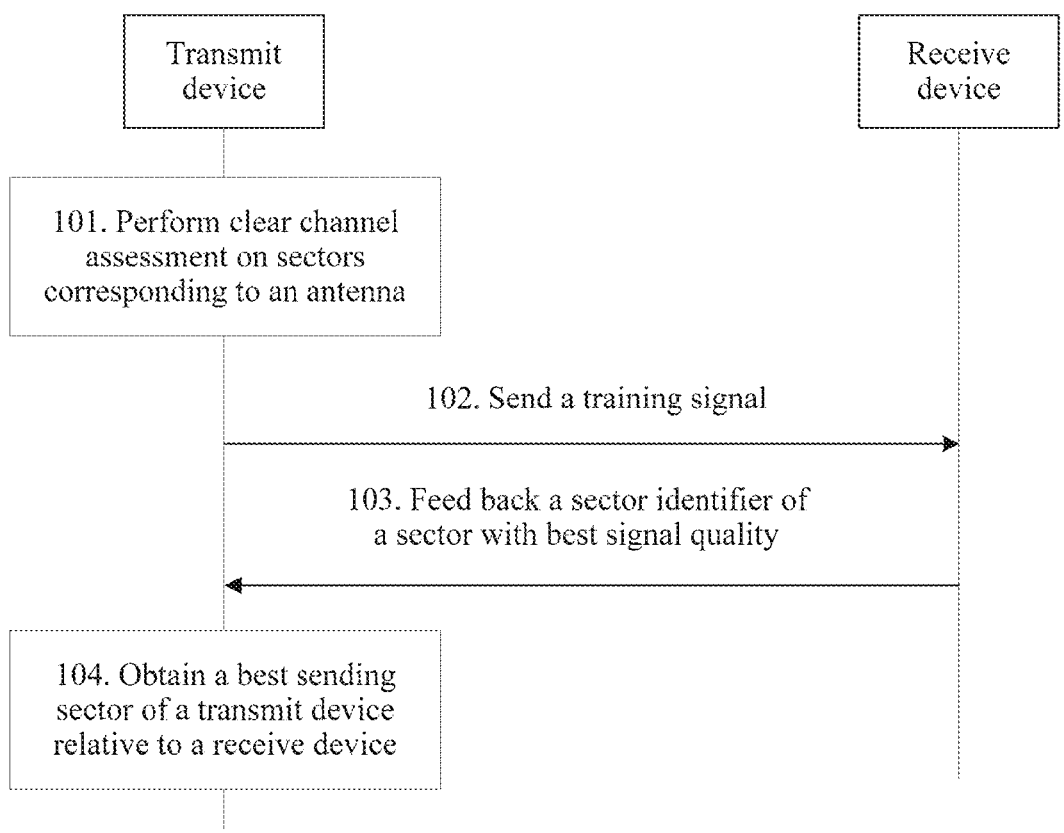
FIG. 2 is a schematic flowchart of a beam training method according to an embodiment of this application.

In the specification, claims, and accompanying drawings of this application, the terms "first", "second", and so on are intended to distinguish between similar objects but do not necessarily indicate a specific order or sequence. It should be understood that the data used in such a way are interchangeable in proper circumstances so that the embodiments described herein can be implemented in other orders than the order illustrated or described herein. In addition, the terms "include", "have", or any other variant thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this specification is merely logical division, and there may be another division during implementation in actual application. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or another form, and this is not limited in this specification. In addition, modules or sub-modules described as separate components may be or may not be physically separated, or may be or may not be physical modules, or may be distributed into a plurality of circuit modules. Objectives of the solutions of the embodiments of this application may be achieved by selecting some or all of the modules according to actual requirements.

The embodiments of this application provide a beamforming training method, a communication device, a chip system, and a storage medium. Beamforming is a mechanism used by a transmitter and a receiver to perform link budgeting before communication. Beamforming training is a process in which a training signal is sent to obtain a best sending sector and/or a best receive sector. Detailed descriptions are provided below.

The beamforming training in the embodiments of this application includes transmit beam training and receive beam training. The transmit beam training is a process in which a transmit device sends, in different sectors, a training signal to a receive device, and obtains a best sending sector of the transmit device. For example, the transmit device separately sends, in four sectors, a training signal to the receive device for four times, the receive device determines a sector with highest signal strength based on received signal strength, and then feeds back sector information of the sector with the highest signal strength to the transmit device, so that the transmit device learns of the best transmit sector of the transmit device.

The receive beam training is a process in which the receive device receives, in different sectors, training signals sent by the transmit device, and obtains a best receive sector of the receive device. For example, the receive device separately receives, in four sectors, training signals sent by the transmit device, and determines a sector with highest reception signal strength as the best receive sector based on received signal strength.

The training signal is a signal used for channel estimation performed for demodulating data or control information or both data and control information, and may also be referred to as a reference signal, a training subframe, a pilot signal, or the like. FIG. 1 shows a structure of the training signal.

Clear assessment is a process in which a communication device assesses, based on a signal received in a to-be-assessed area of the communication device, whether the to-be-assessed area is idle.

Clear channel assessment means performing the foregoing clear assessment in the to-be-assessed area based on a channel, including clear channel assessment on sectors corresponding to an antenna and clear channel assessment in all directions corresponding to an antenna. The clear channel assessment on the sectors corresponding to the antenna means performing clear channel assessment on a specific sector corresponding to the antenna, and may be understood as performing clear channel assessment on sectors corresponding to directions pointing to less than 360 degrees of the antenna, and may also be referred to as directional clear assessment. The clear channel assessment on the omnidirectional channel corresponding to the antenna means performing clear channel assessment in directions pointing to 360 degrees of the antenna, and may also be referred to as omnidirectional clear assessment. It should be noted that the omnidirectional clear assessment and the directional clear assessment need to be supported by an operating status of the antenna. During omnidirectional receiving, the antenna performs receiving in all directions pointing to 360 degrees, so that omnidirectional clear channel assessment can be supported; during directional receiving, the antenna performs receiving in directions pointing to less than 360 degrees, so that directional clear channel assessment can be supported. When omnidirectional receiving is switched to directional receiving, the antenna may focus a radiation range of the antenna to the directions pointing to less than 360 degrees. When directional receiving is switched to omnidirectional receiving, the antenna may expand a radiation range of the antenna to all the directions pointing to 360 degrees.

The transmit device may determine, based on whether energy of a received signal exceeds a preset threshold, whether a status of a sector or an omnidirectional channel is idle. When energy of a signal received by the antenna during omnidirectional receiving or directional receiving (in a sector) does not exceed a preset threshold, a result of clear channel assessment is idle in this case; or when energy of a signal received by the antenna during omnidirectional receiving or directional receiving exceeds a preset threshold, an assessment result is busy in this case.

Alternatively, the transmit device may determine a status based on whether the antenna receives a signal during omnidirectional receiving or directional receiving in a sector. When the antenna receives a signal during omnidirectional receiving or directional receiving, a result of clear channel assessment is busy; or when the antenna receives no signal during omnidirectional receiving or directional receiving, a result of clear channel assessment is idle.

Because in an existing mechanism, for directional transmission in some frequency bands, beam training can be performed only when channels are idle in all directions, a waste of resources is caused. The embodiments of this application mainly provide the following technical solution to resolve the problem of the waste of resources and ensure normal running of services in these frequency bands.

The transmit device may perform the clear channel assessment on the sectors corresponding to the antenna; and then send, in a sector whose result of clear channel assessment is idle, a training signal, without a need to wait until the omnidirectional channel is idle. With this solution, resource utilization can be ensured. In addition, duration required for the clear channel assessment on the sectors corresponding to the antenna is far longer than duration of the clear channel assessment on the omnidirectional channel, and considering that the omnidirectional channel may be busy only within a time period, the omnidirectional channel may have been idle when the transmit device performs the clear channel assessment on the sectors corresponding to the antenna. Therefore, to improve beamforming training efficiency, a time threshold may be further set, so that after the transmit device sequentially performs the clear channel assessment on the sectors for a time period, the transmit device switches to performing clear channel assessment on the omnidirectional channel, and after the switching, transmit training needs to be performed only on a sector in which no training signal has been sent. It may be learned that, beamforming training efficiency can be improved to some extent.

Figures 1, 2:
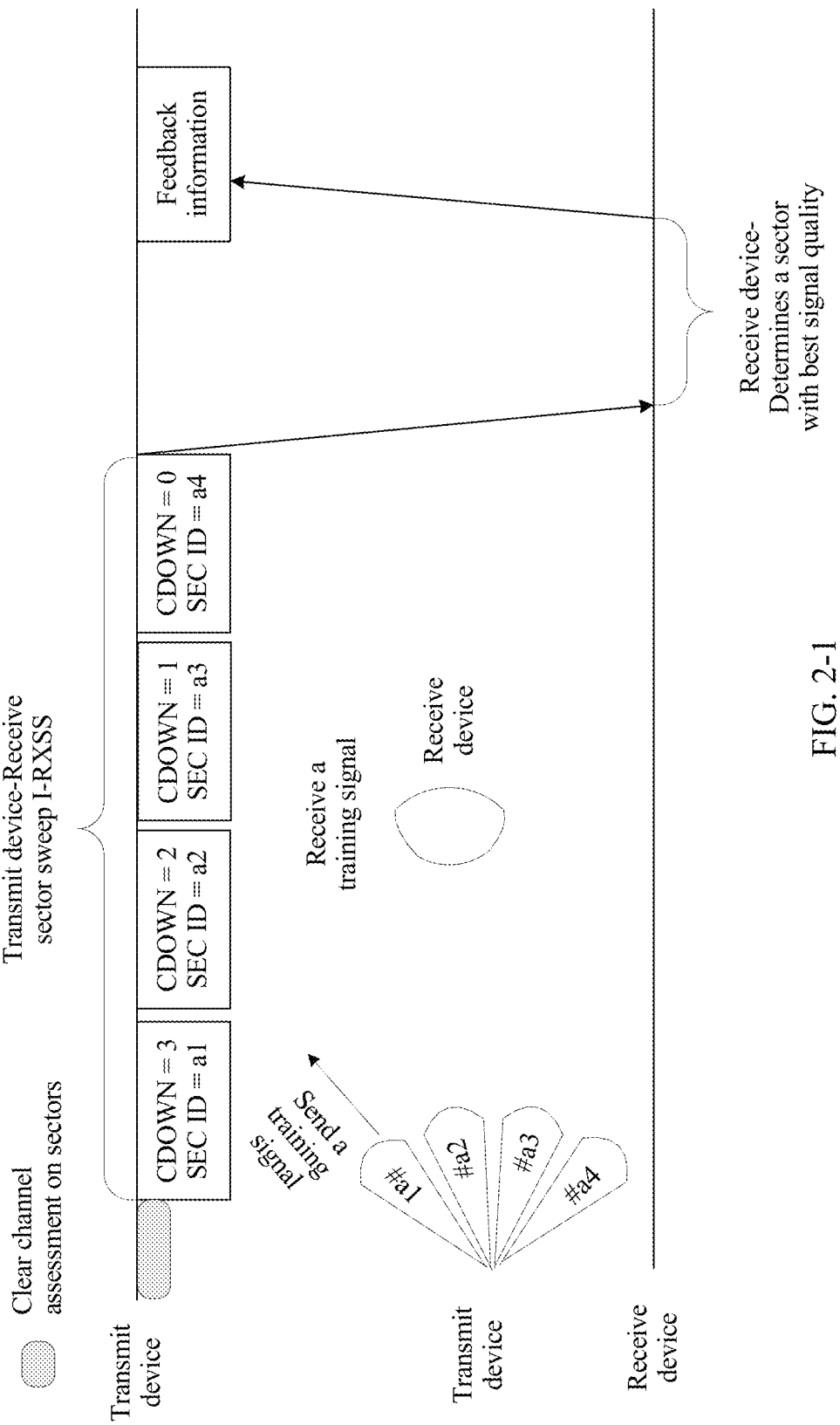
FIG. 1 is a schematic structural diagram of a training signal according to an embodiment of this application.
Figure 2:
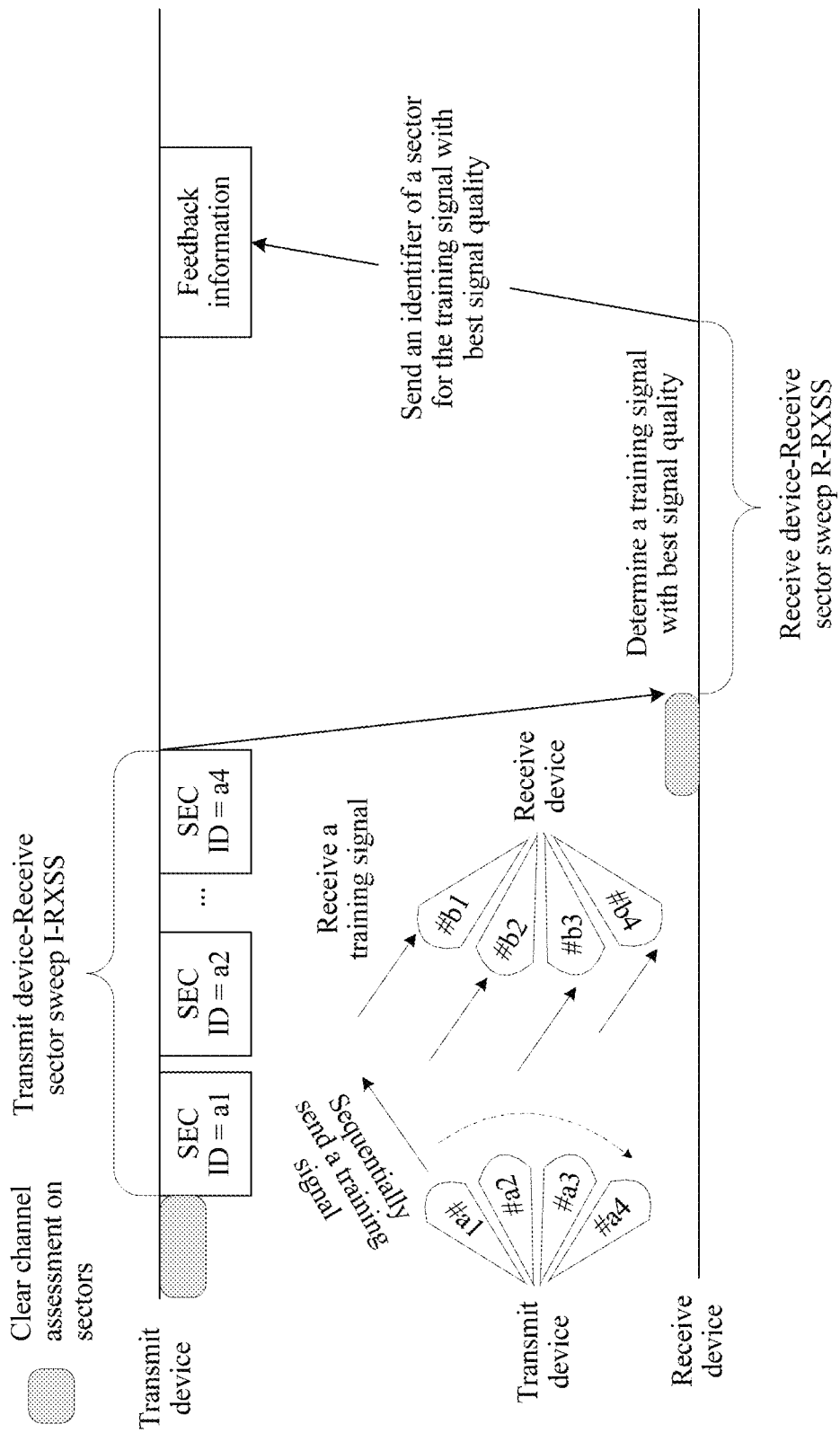

Referring to FIG. 2, a beamforming training method provided in this application is illustrated below. The method in this embodiment of this application includes the following steps.

101. A transmit device performs clear channel assessment on sectors corresponding to an antenna.

Specifically, the transmit device may perform clear channel assessment in the following manner: sequentially performing clear channel assessment on all the sectors corresponding to the antenna, so that each time the transmit device performs clear channel assessment on one sector, the transmit device may determine, based on a result of the clear channel assessment corresponding to the sector, whether the sector is an idle sector. When energy of a signal received in a sector by the transmit device is less than a preset threshold, a result of clear channel assessment on the sector is idle. When energy of a signal received in a sector by the transmit device is greater than or equal to a preset threshold, it indicates that a result of clear channel assessment on the sector is busy, and the transmit device continues to assess a next sector.

When the transmit device sequentially performs the clear channel assessment on the sectors corresponding to the antenna, the transmit device may sequentially assess the sectors in a clockwise direction or a counterclockwise direction. Based on a result of the clear channel assessment, the transmit device may continue to perform step 102, or jump to a next sector to continue to perform clear channel assessment. For example, in this embodiment of this application, the sectors corresponding to the antenna may include all sectors corresponding to all directions of the antenna.

Optionally, in another implementation, the transmit device may perform clear channel assessment on corresponding sectors within a specified range. Alternatively, it may be understood that the transmit device performs clear channel assessment on some of M sectors.

102. The transmit device sends, in a sector whose result of clear channel assessment is idle, a training signal to a receive device.

The training signal may carry a sector identifier of the sector in which the training signal is sent. The training signal is used to perform beamforming training on the antenna. Specifically, the training signal may be used to perform transmit beam training on the sector in which the training signal is sent, and may perform receive beam training on a sector in which the training signal is received. A definition of the training signal is described in more detail in a subsequent embodiment.

The transmit device sends the training signal in the sector whose result of clear channel assessment is idle, continues to perform clear channel assessment on a sector whose result of clear channel assessment is non-idle, and sends a training signal when a result of clear channel assessment is idle, until training signals have been sent in all to-be-assessed sectors on a transmit device side.

103. The receive device receives the training signal sent by the transmit device, determines a sector with best signal quality, adds a sector identifier of the sector with best signal quality to feedback information, and feeds back the feedback information to the transmit device.

104. After receiving the sector identifier fed back by the receive device, the transmit device obtains a best sending sector of the transmit device relative to the receive device.

After the transmit device obtains the best sending sector of the transmit device relative to the receive device, the transmit beam training of the transmit device is completed, and the transmit device may send, in the best sending sector, data to the receive device.

In step 103, the receive device may receive the training signal from the transmit device in an omnidirectional receiving manner or a directional receiving manner. A specific manner may be predetermined by the receive device and the transmit device. Details are not limited in this application.

Referring to FIG. 2-1, if the receive device uses the omnidirectional receiving manner, to be specific, the receive device receives, in the omnidirectional receiving manner, the training signal sent by the transmit device, the receive device may add the sector identifier of the sector with best signal quality to an acknowledgement response returned by the transmit device.

After receiving a plurality of training signals sent by the transmit device in a plurality of idle sectors, the receive device selects a sector with best signal quality as a best sending sector of the transmit device, and then feeds back a sector identifier of the best sending sector of the transmit device to the transmit device, so that the transmit device obtains a sector with best transmitted signal quality of the transmit device relative to the receive device. In this way, the transmit beam training of the transmit device is completed.

If the receive device uses the directional receiving manner, to be specific, the receive device receives, by performing clear channel assessment on the sectors corresponding to the antenna, the training signal sent by the transmit device, when receiving the training signal, the receive device may further perform receive beam training based on the received training signal. In addition, the receive device may perform clear channel assessment on sectors corresponding to an antenna of the receive device, and then add a sector identifier of a determined sector with best signal quality to a generated training signal, and feed back the generated training signal to the transmit device, so that transmit beam training may also be performed on the receive device.

For example, FIG. 2-2 is a schematic diagram of performing transmit beam training by a transmit device. In FIG. 2-2, the transmit device has four sectors: #a1, #a2, #a3, and #a4. A receive device has four sectors: #b1, #b2, #b3, and #b4. In a dashed arrow direction, the transmit device sequentially sends four training signals in #a1, #a2, #a3, and #a4, and the receive device receives, in #b1, #b2, #b3, and #b4 sectors, the four training signals sent by the transmit device. The receive device determines a training signal with best signal quality based on the received training signals, and then feeds back, to the transmit device, a sector identifier indicated in the training signal with best signal quality. In this way, transmit beam training on the transmit device is completed. It may be understood that directions and quantities of sectors in FIG. 2-2 are merely used for illustration. Directions and quantities of sectors are not limited in this embodiment of this application. This also applies to other figures.

In comparison with an existing mechanism, in this embodiment of this application, clear channel assessment, to be specific, directional clear assessment on sectors corresponding to an antenna is performed. Regardless of whether some sectors of a current antenna are idle or an omnidirectional channel is idle, an idle sector can be identified by performing the directional clear assessment in this application, and a training signal is sent in the idle sector. This avoids a prior-art problem that a waiting time is excessively long because a training signal can be sent only when a plurality of sectors of the antenna are all idle. In one aspect, because the idle sector can be detected in a timely manner, resource utilization is increased. In another aspect, because a training signal is preferentially sent in the idle sector when some sectors are occupied, beamforming training efficiency is improved.

The training signal is described below in more detail. The training signal sent in the idle sector may carry a first indicator bit, and the first indicator bit is used to indicate a sector identifier of the sector from which the training signal is sent. Alternatively, the training signal may carry a second indicator bit, and the second indicator bit is used to indicate a quantity of sectors in which no training signal has been sent among the sectors corresponding to the antenna. The quantity can also indicate whether beam sweep in all the sectors of the antenna has ended. For example, if the indicated quantity of sectors is 0, it means that a training signal has been sent in all the sectors, and also indicates that beam sweep in all the sectors of the antenna has ended. If the indicated quantity of sectors is not 0, it means that no training signal has been sent in some sectors, and beamforming training is not completed, in other words, beam sweep has not ended. The first indicator bit and the second indicator bit may be located in a control field of the training signal. Optionally, the second indicator bit may be in a countdown (Cdown) form. In this case, a quantity of sectors in which no training signal has been sent among to-be-assessed sectors may be determined based on a value of the second indicator bit.

The quantity of sectors in which no training signal has been sent not only is indicated by adding the second indicator bit to the training signal, but also may be implemented through counting by the transmit device. Specifically, when a training signal is sent in a sector whose result of clear channel assessment is idle, the transmit device counts sectors in which no training signal has been sent among the sectors corresponding to the antenna. In other words, each time a training signal is sent in one idle sector, the transmit device counts once. The transmit device may count by using a counter.

In different application scenarios, the training signal may have different structures. This is not limited in this embodiment of this application. For example, in an application scenario of a Wireless Fidelity (WiFi) technology, the first indicator bit or the second indicator bit may be located in a control field of the training signal, where Cdown may be carried in a sector sweep (SSW) field of the training signal. FIG. 3 shows a structure of the SSW field. For another example, in an application scenario of a cellular network, the first indicator bit or the second indicator bit may be carried in a physical downlink control channel (PDCCH) for transmission, where the PDCCH is located in a control region of a frame structure.

Further illustration is provided below by using a case in which the second indicator bit is Cdown. Clear assessment is sequentially performed on a plurality of to-be-assessed sectors. When it is detected that a sector is idle, a value of Cdown is decreased progressively; when it is detected that a sector is busy, a value of Cdown is not decreased progressively, and the busy sector may be skipped and Cdown is frozen or hidden.

For example, an initial value of Cdown may be a quantity of all sectors in which a training signal is to be sent. When eight sectors are to be swept, the initial value of Cdown is 7. Then, clear assessment is sequentially performed on each sector. When it is detected that a first sector is idle, a training signal is sent in the first sector, and Cdown is decreased by 1. After the clear channel assessment on the first sector is completed, Cdown=6. Then, clear channel assessment is performed on a second sector. When it is detected that the second sector is busy, a value of Cdown is not decreased progressively. After the clear channel assessment on the second sector is completed, Cdown=6. Then, clear channel assessment is performed on a third sector, and so on. After clear channel assessment on the eight sectors is completed, if Cdown=2, it indicates that two sectors are in a busy state, and no training signal has been sent in the two sectors. In this case, clear channel assessment is continued on the sectors in which no training signal has been sent, until a training signal has been sent in the eight sectors. If Cdown=0, it indicates that all the eight sectors are idle and a training signal has been sent in all the eight sectors.

Then, a moment at which a training signal is sent is illustrated.

When a system does not have a fixed time domain structure, a start sending moment at which a training signal is sent meets the following: when it is found through clear assessment that a sector is idle, a training signal is sent in this sector.

When a system has a fixed time domain structure, a start sending moment of a training signal meets the following: when a training signal is sent in each idle sector, the sending of the training signal is based on a preset time domain structure and starts from a boundary of a subframe in the time domain structure, or the start sending moment of the training signal may be a boundary of a transmission time interval (TTI). The boundary may also be referred to as a start sending moment.

In some embodiments, when performing clear channel assessment, the transmit device may perform clear channel assessment on only sectors corresponding to the antenna, or may perform clear channel assessment on an omnidirectional channel corresponding to the antenna. Specifically, the following cases are mainly included:

Case 1: When performing clear channel assessment, the transmit device first performs clear channel assessment on an omnidirectional channel corresponding to the antenna.

If a result of the clear channel assessment on the omnidirectional channel corresponding to the antenna is busy, the transmit device switches to performing clear channel assessment on the sectors corresponding to the antenna.

Case 2: When performing clear channel assessment, the transmit device first performs clear channel assessment on the sectors corresponding to the antenna.

After duration of the clear channel assessment on the sectors corresponding to the antenna reaches preset duration, the transmit device switches from performing the clear channel assessment on the sectors corresponding to the antenna to performing clear channel assessment on an omnidirectional channel corresponding to the antenna.

When a result of the clear channel assessment on the omnidirectional channel is idle, the transmit device sends a training signal in a sector in which no training signal has been sent.

In case 2, beam training efficiency can be improved, and a problem of relatively low resource utilization caused by unnecessary waiting is reduced.

In case 1 and case 2, a clear channel assessment manner used by the transmit device is the foregoing alternate manner. For clear channel assessment that is performed alternately, duration of the clear channel assessment on the sectors corresponding to the antenna or duration of the clear channel assessment on the omnidirectional channel may be further set, or an alternating cycle of the clear channel assessment on the sectors corresponding to the antenna and the clear channel assessment on the omnidirectional channel may be further set. Optionally, a timer may be set for the clear channel assessment on the sectors corresponding to the antenna or the clear channel assessment on the omnidirectional channel. When duration of the clear channel assessment on the sectors corresponding to the antenna or duration of the clear channel assessment on the omnidirectional channel reaches a preset threshold, a clear channel assessment manner may be switched. The threshold may be a preset absolute constant value, or the threshold is set to total duration of transmit beam training on at least one sector, or the threshold is set to P units of duration, where P is a positive integer. A value range or a manner of taking a value of the threshold is not limited in this application.

Figure 4:
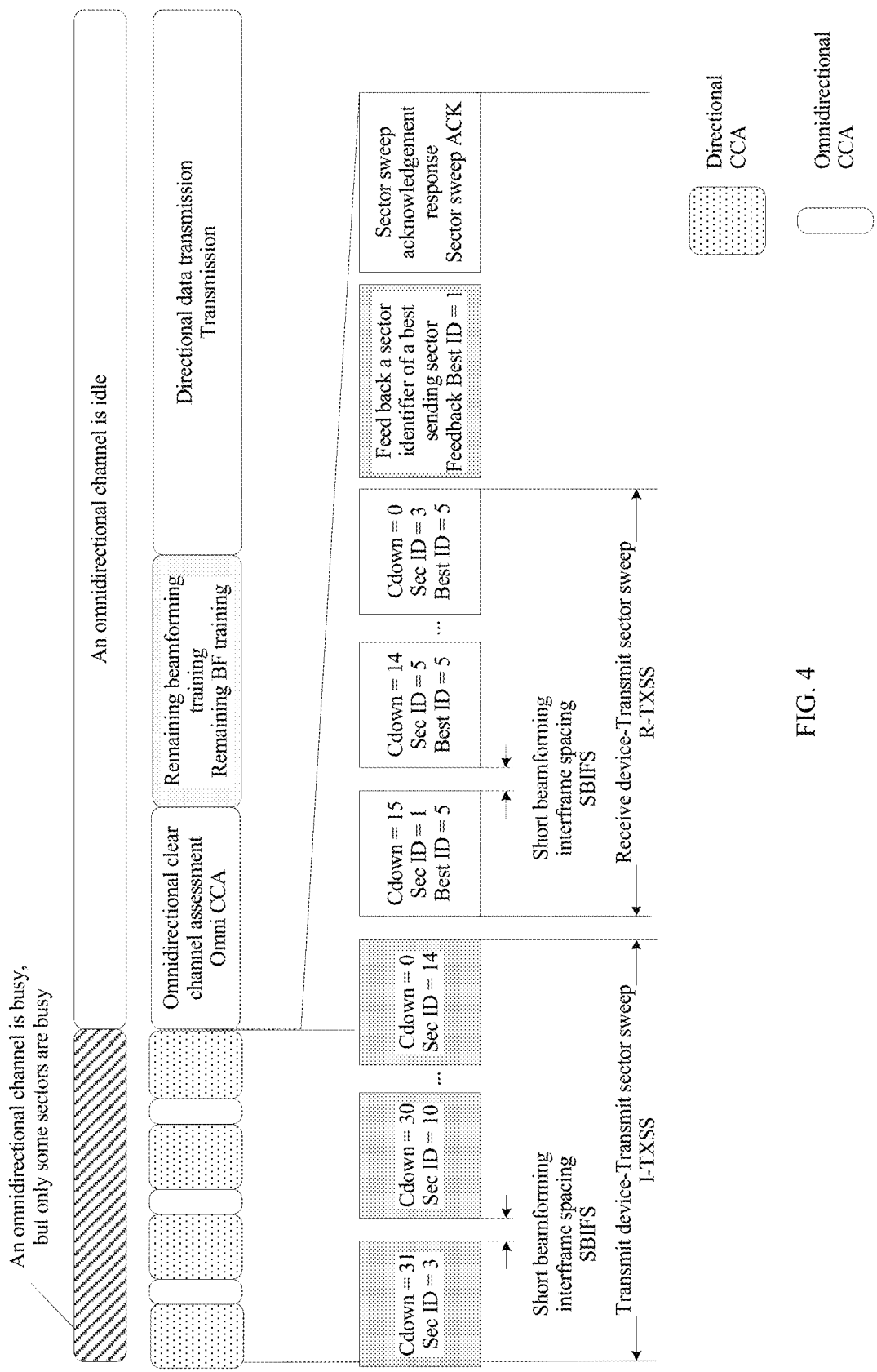
FIG. 4 is a schematic diagram of alternate use of omnidirectional CCA and directional CCA according to an embodiment of this application.

For example, in case 2, FIG. 4 is a schematic diagram of alternate use of omnidirectional clear channel assessment and directional clear channel assessment. In a period of time, if it is found through omnidirectional clear channel assessment that a current channel is busy, the omnidirectional clear channel assessment may be switched to directional clear channel assessment. When it is found through assessment on a sector that a channel is idle, a training signal is sent in the idle sector. After being performed for a time period, the directional clear channel assessment is switched back to omnidirectional clear channel assessment. When the directional clear channel assessment is switched to omnidirectional clear channel assessment, if it is detected that an omnidirectional channel is idle, beamforming training is continued on a remaining sector, to be specific, a sector in which no training signal has been sent. Certainly, if it is detected at a moment that channels are busy in all directions, the omnidirectional clear channel assessment may be switched to directional clear channel assessment to detect an idle sector, and so on, until beamforming training in sectors in all directions is completed. For example, when the transmit device learns, from feedback of the receive device, that a best sending sector of the transmit device is a sector whose Sec ID=5, if it is detected that the omnidirectional channel is idle, or it is detected that the sector whose Sec ID=5 is idle, directional data transmission may be performed in the sector whose the Sec ID=5.

In case 2, when the transmit device switches from performing directional clear channel assessment to performing omnidirectional clear channel assessment and a result of the omnidirectional clear channel assessment is idle, CCA needs to be performed on only some sectors in which beam training is not completed. In this way, beam training efficiency is improved and a beamforming training mechanism is optimized.

Case 3: When performing clear channel assessment, the transmit device performs clear channel assessment on only the sectors corresponding to the antenna.

Certainly, for some specified frequency bands or a service with a relatively high priority, only a clear channel assessment manner in case 3 may be used. A specific manner may change with an application scenario, and is not limited in this embodiment of this application.

In some embodiments, the antenna of the transmit device corresponds to M sectors, and the antenna of the receive device corresponds to N sectors, where M and N each are a positive integer greater than 1, and M may be equal to or not equal to N. Receive beam training and/or receive beam refinement may be further performed on the receive device. Because a manner of sending/receiving a training signal by the transmit device and a manner of receiving/sending a training signal by the receive device may be predetermined, a beam training process of the receive device and a receiving training process of the transmit device may differ mainly in the following two scenarios:

Scenario 1: The transmit device performs clear channel assessment on the sectors corresponding to the antenna, to send a training signal, and the receive device performs clear channel assessment on an omnidirectional channel corresponding to the antenna of the receive device, to receive the training signal.

In this way, after transmit beam training on the transmit device is completed, receive beam training and/or receive beam refinement may be further performed on the receive device. Specifically, the transmit device performs clear channel assessment on a best sending sector. If the transmit device detects that a sector status of the best sending sector is idle, the transmit device sends a training signal in the best sending sector for N times, in other words, the transmit device sends, in a sector with best transmitted signal quality, a training signal to the N sectors of the receive device. The receive device determines, based on training signal receiving results of the N sectors, a sector with best received signal quality as a best receive sector relative to the transmit device, to perform receive beam training and/or receive beam refinement on the receive device.

Correspondingly, in scenario 1, transmit beam training may be further performed on the receive device and receive beam training may be further performed on the transmit device. A principle of the transmit beam training on the receive device is similar to a principle of the receive beam training on the transmit device. The receive device may perform clear channel assessment on all sectors of the antenna, and send, in a determined idle sector, a training signal to the transmit device. The training signal sent by the receive device may be used for performing transmit beam training on all the sectors of the antenna of the receive device. After receiving a plurality of training signals from the receive device, the transmit device selects a sector with best signal quality as a best sending sector of the receive device relative to the transmit device. Further, the receive device sends, in the best sending sector of the receive device, a training signal to the transmit device for M times, and the transmit device determines, based on training signal receiving results of the transmit device in the M sectors, a sector with best received signal quality as a best receive sector relative to the receive device, to perform receive beam training on the transmit device.

Scenario 2: The transmit device performs clear channel assessment on the sectors corresponding to the antenna, to send a training signal, and the receive device performs clear channel assessment on sectors corresponding to the antenna of the receive device, to receive the training signal.

When receiving a training signal sent by the transmit device, the receive device also performs receive beam training on the antenna of the receive device. Then, when feeding back the best sending sector of the transmit device, the receive device also performs transmit beam training on the receive device. Specifically, when performing the clear channel assessment on the sectors corresponding to the antenna, the transmit device sequentially sends, in each sector whose result of clear channel assessment is idle, a training signal to the M sectors of the receive device. The training signal sent by the transmit device may be used to perform transmit beam training on the transmit device, or may be used to perform receive beam training on the receive device.

Then, the receive device sequentially sends, in each sector whose result of clear channel assessment is idle, a training signal to the M sectors corresponding to the antenna of the transmit device, and adds, to the training signal, a sector identifier of the best sending sector of the transmit device, to perform transmit beam training on the transmit device and perform receive beam training on the receive device.

The training signal sent by the receive device can be used to perform transmit beam training on the receive device and perform receive beam training on the transmit device. Specifically, when the receive device performs the transmit beam training, the transmit device receives, in the sectors corresponding to the antenna, the training signals sent by the receive device, and then the transmit device uses a sector with best received signal quality as a best receive sector of the antenna of the transmit device, and determines a best sending sector of the receive device, and feeds back the best sending sector of the receive device to the receive device. In this way, the transmit beam training on the receive device is completed, and the receive beam training on the transmit device can also be performed.

It can be learned that with the solution in scenario 2, duration of beamforming training can be further shortened, and therefore beamforming training efficiency is improved.

Figure 5:
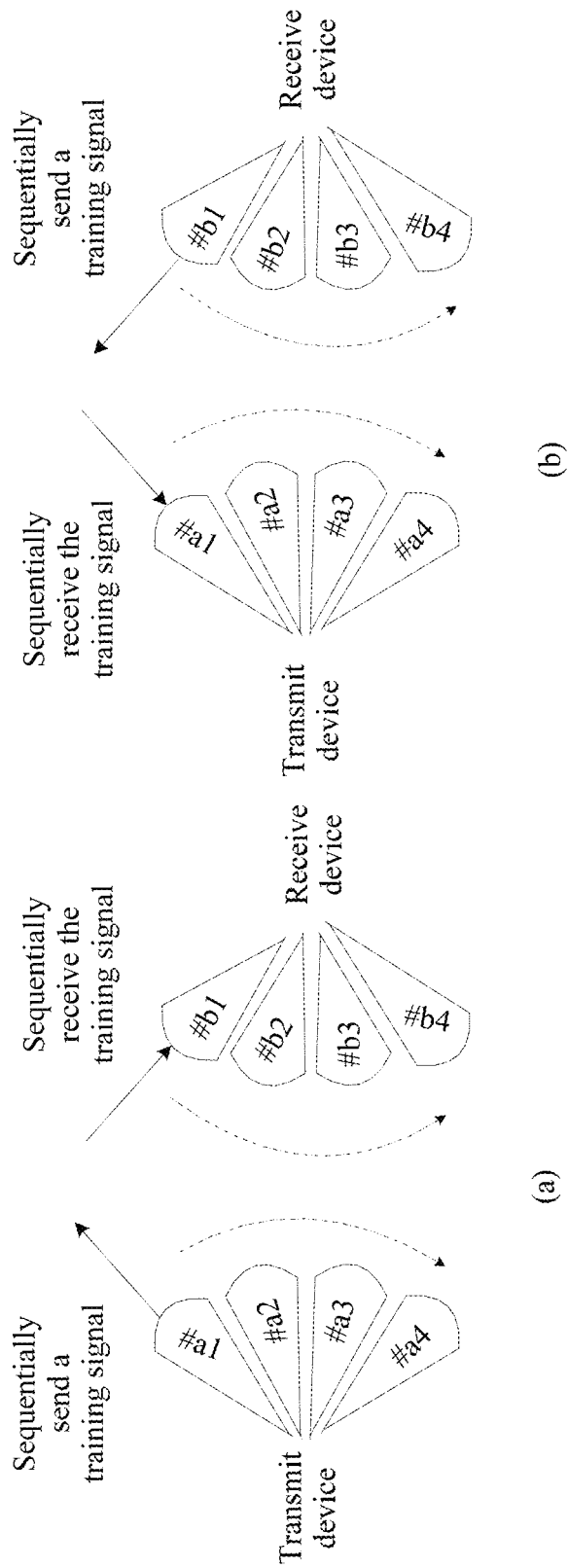
FIG. 5 is a schematic diagram of performing beamforming training by a transmit device and a receive device according to an embodiment of this application.

For a specific embodiment of scenario 2, refer to FIG. 5. (a) in FIG. 5 is a schematic diagram of performing transmit beam training by a transmit device, and (b) in FIG. 5 is a schematic diagram of performing transmit beam training by a receive device. In FIG. 5, the transmit device has four sectors: #a1, #a2, #a3, and #a4. The receive device has four sectors: #b1, #b2, #b3, and #b4. In (a) in FIG. 5, the transmit device sequentially sends four training subframes in the #a1 sector, and in a dashed arrow direction, the receive device sequentially receives, in #b1, #b2, #b3, and #b4 sectors, the four training subframes sent by the transmit device. For example, the receive device receives, in the #b1 sector, a first training subframe sent in the #a1 sector by the transmit device, receives, in the #b2 sector, a second training subframe sent in the #a1 sector by the transmit device, receives, in the #b3 sector, a third training subframe sent in the #a1 sector by the transmit device, and receives, in the #b4 sector, a fourth training subframe sent in the #a1 sector by the transmit device. In this way, after sequentially sending the four training subframes in the four sectors, the transmit device may determine a best sending sector of the transmit device relative to the receive device, and may determine a best receive sector of the receive device relative to the transmit device. Similarly, referring to (b) in FIG. 5, after directional sending and directional receiving performed by the receive device and the transmit device, a best sending sector of the receive device relative to the transmit device may be determined, and a best sending sector of the transmit device relative to the receive device may be determined. This also applies to specific beam training. Details are not described again.

The beamforming training method provided in this embodiment of this application may be applied to an unlicensed frequency band. The unlicensed frequency band is relative to a licensed frequency band. The unlicensed frequency band includes WiFi, near field communication (NFC), Bluetooth, and the like. Due to particularity of the unlicensed frequency band, when the transmit device needs to transmit a signal, the transmit device needs to perform listening through CCA, and transmits the signal when the transmit device finds, through listening, that no signal is being transmitted in the unlicensed frequency band. After performing the CCA, the transmit device further needs to perform beamforming training. Performing transmit beam training and receive beam training by a transmit device and a receive device in an interaction process between the transmit device and the receive device is illustrated below by using an example in which CCA is used as an implementation of clear channel assessment and the transmit device interacts with the receive device by using a training subframe.

CCA may be a mechanism used to assess whether a channel is idle. Based on an assessment scope, the CCA may include omnidirectional CCA (omni CCA) and directional CCA.

The omnidirectional CCA means assessing a status of an omnidirectional channel by the transmit device when an antenna performs omnidirectional receiving. It may be understood that the transmit device assesses signals received in receiving directions pointing to 360 degrees of the antenna.

The directional CCA means assessing a status of a sector corresponding to an antenna by the transmit device when the antenna performs directional receiving. A range of the directional receiving may correspond to one or more sectors. It may be understood that the transmit device assesses a signal or signals received in the one or more sectors corresponding to the antenna.

Specifically, the transmit device and the receive device may perform their respective transmit beam training in an SLS phase through transmit sector sweep (full name in English: Transmit Sector Sweep, TXSS for short in English), and perform their respective receive beam training and receive beam refinement in a beam refinement protocol (BRP) phase.

In the SLS phase, a training subframe is sent in an idle sector by sequentially performing directional CCA on each to-be-detected sector, CCA is continued in a non-idle sector until the non-idle sector is idle, and then a training subframe is sent in the idle sector, until training subframes have been sent in all sectors. In this way, both the transmit device and the receive device can learn their respective best sending sectors. In addition, in the SLS phase, after directional CCA is performed in all sectors for a period of time, the directional CCA may be switched to omnidirectional CCA, and if it is detected that an omnidirectional channel is idle, a training signal is directly sent in a sector in which no training signal has been sent. In this way, beamforming training efficiency can be improved and waiting duration is reduced.

Figure 6:
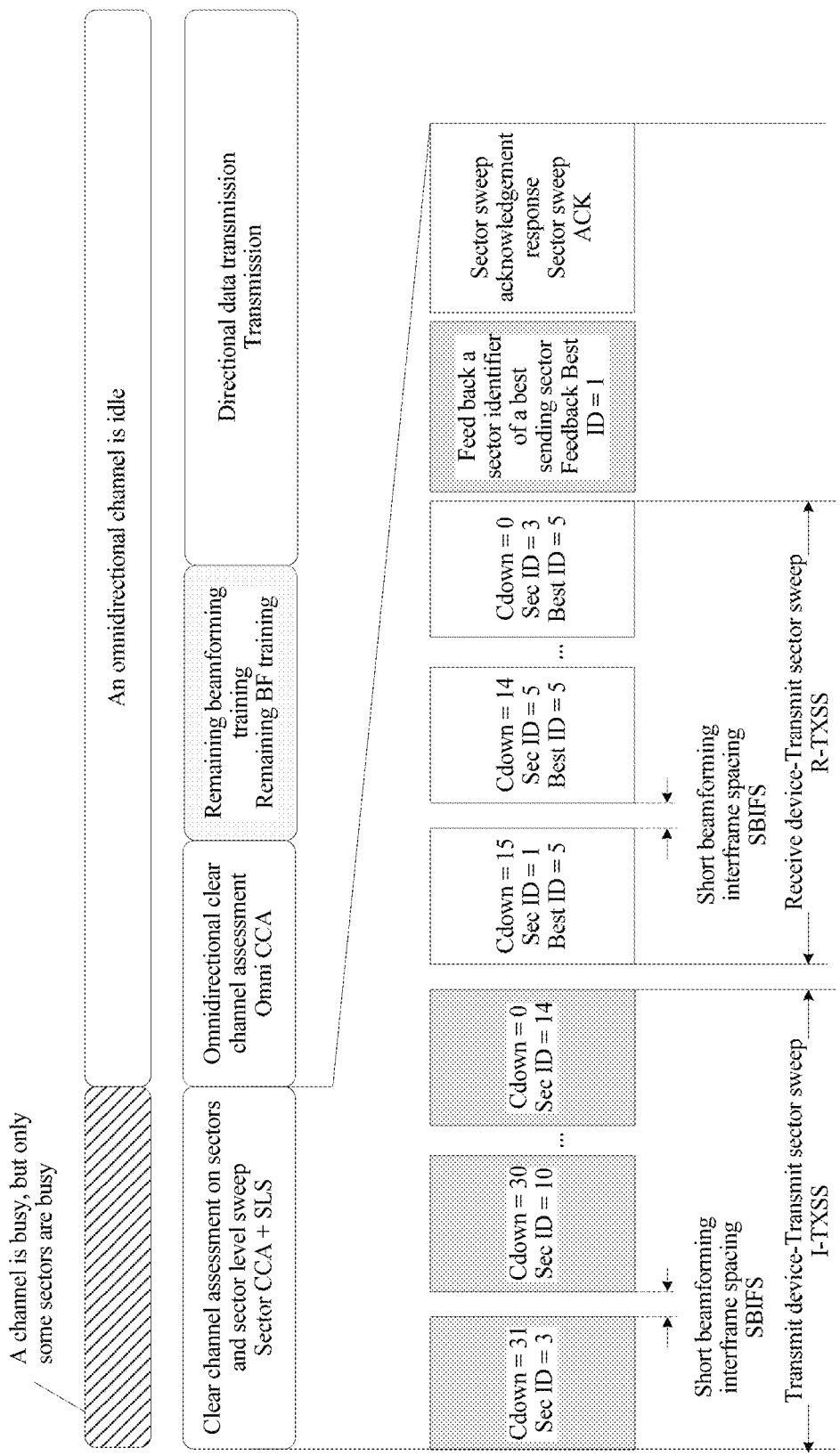
FIG. 6 is a schematic diagram of performing transmit beam training by a transmit device and a receive device according to an embodiment of this application.

FIG. 6 is a schematic diagram of sending a training subframe by a transmit device and receiving the training subframe by a receive device. The training subframe sent by the transmit device carries a first indicator bit (namely, a Sec ID of a sector in which the training subframe is sent) and a second indicator Cdown. In FIG. 6, when some sectors of an antenna are currently busy, the transmit device performs directional CCA and sector level sweep (SLS). In the SLS phase, the transmit device sequentially performs directional CCA in each sector, and when detecting that a sector whose Sec ID=3 (this is represented by a #3 sector below, and sectors with other Sec IDs are represented in a similar way) is not occupied, sends a training subframe in the #3 sector. In this case, Cdown is 31. When sending the training subframe in the #3 sector, the transmit device adds a first indicator bit (Sec ID=3, used to indicate the sector whose Sec ID=3) and a second indicator bit (Cdown=31) to the training subframe. Then, the transmit device sends a training subframe in an unoccupied #10 sector, . . . , and an unoccupied #14 sector, until training subframes have been sent in all sectors. For sending of a training subframe in other sectors, refer to the description about the #3 sector. Details are not described again.

For example, a short beamforming interframe spacing (SBIFS) in FIG. 6 is an interframe spacing for training subframes. The SBIFS is used to switch from clear channel assessment on sectors corresponding to an antenna or clear channel assessment on an omnidirectional channel, or is used to switch between clear channel assessment on different sectors. For example, in FIG. 6, after beamforming training on the #3 sector is completed, the transmit device can switch, only after one SBIFS, from the #3 sector to the #10 sector to send a training subframe.

In the SLS phase, after receiving the training subframe sent by the transmit device, the receive device determines a #5 sector as a best sending sector of the transmit device based on signal strength of the received training subframe, and then feeds back a sector identifier of the #5 sector to the transmit device. Finally, the receive device receives an acknowledgement (ACK) response returned by the transmit device. Similarly, the transmit device acknowledges a #1 sector as a best transmit sector of the receive device after receiving a training subframe sent by the receive device, and returns a sector identifier of the #1 sector to the receive device by using feedback information. Both the sector identifier of the best sending sector and a sector identifier of a best receive sector may be indicated to a peer party by using a control field in a training subframe, for example, indicated by using a best identifier (Best ID) field. In an interaction process, the transmit device obtains the best sending sector relative to the receive device, and the receive device obtains the best sending sector relative to the transmit device.

In addition, the receive beam training in FIG. 6 is further applicable to non-initial training, for example, late-stage training (for example, beam refinement), to be specific, training performed after the best sending sector of the transmit device is determined or the best sending sectors of the transmit device and the receive device are determined. In this case, the beam sending procedures for the receive device and the transmit device in FIG. 6 may be further used in a refinement procedure performed on receive beams of the receive device and the transmit device.

In the BRP phase, the transmit device and the receive device further need to perform receive beam training on the peer party by using their respective best sending sectors. The transmit device performs directional CCA on the #5 sector, that is, the best sending sector of the transmit device, and if the transmit device detects that the #5 sector is not occupied, the transmit device may successively send M training signals in the #5 sector. The M training signals are same training signals, and each training signal carries a first indicator bit and a second indicator bit. The first indicator bit indicates a sector identifier of #5. M is a quantity of to-be-detected sectors of the receive device. The M sectors may be located in various directions of the receive device or may be located in a specified direction of the receive device. The receive device receives the M training signals in the M sectors, and selects one sector with best received signal quality as a best receive sector. Correspondingly, the receive device may also obtain a best receive sector of the receive device relative to the transmit device. In this way, receive beam training processes of the transmit device and the receive device are completed.

Figure 7:
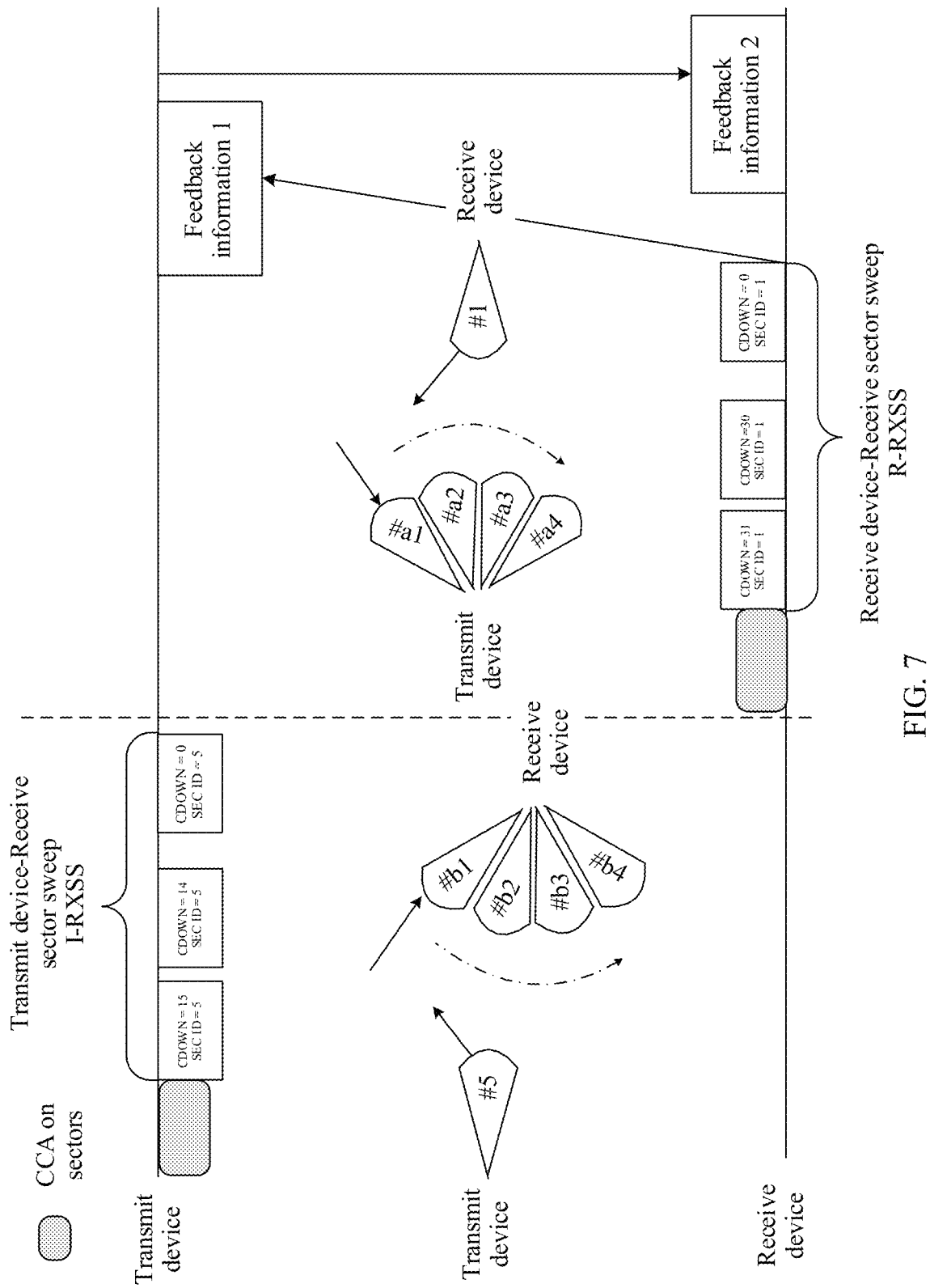
FIG. 7 is a schematic diagram of performing receive beam training by a transmit device and a receive device according to an embodiment of this application.

For example, FIG. 7 is a schematic diagram of the receive beam training processes of the transmit device and the receive device in the foregoing scenario 1. In the SLS phase, the transmit device has learned that the best sending sector of the transmit device is the #5 sector, and the receive device has learned that the best sending sector of the receive device is the #1 sector. In the BRP phase, the transmit device successively sends a training signal for four times in the #5 sector, the receive device receives the four training signals in the four sectors (including the #b1 to #b4 sectors), and finally the receive device determines one (for example, the #b2 sector) of the #b1 to #b4 sectors as a best receive sector of the receive device. Then, the receive device sends a training signal for four times in the #1 sector. The receive device may add, to the training signals, feedback information 1 used for acknowledging the best receive sector (a Sec ID of the #b2 sector), and the transmit device receives the four training signals in the four sectors (including the #a1 to #a4 sectors). By receiving the four training signals, the transmit device can acknowledge one (for example, the #a2 sector) of the #a1 to #a4 sectors as a best receive sector of the transmit device. Then, the transmit device may send, to the receive device, feedback information 2 used for acknowledging the best receive sector (a Sec ID of the #a2 sector). In this way, receive beam training on the receive device and the transmit device is completed.

It may be understood that in another implementation, the best sending sector and the best receive sector of the transmit device may be a same sector, and the best sending sector and the best receive sector of the receive device may be a same sector. This is not limited in this implementation of this application.

It should be noted that technical features of the training signal, the first indicator bit, the second indicator bit, duration of clear channel assessment, and the like in the embodiments (including FIG. 1 to FIG. 7) described in the foregoing content are also applicable to all embodiments (including embodiments corresponding to FIG. 8 and FIG. 9) in subsequent content of this application. Details about similarities are not described again subsequently.

The beam training method in this application is illustrated above, and a communication device performing the foregoing beam training method is described below. For a communication device 80 in FIG. 8 in an embodiment of this application, refer to the description in the embodiment shown in any one of FIG. 1 to FIG. 7. The communication device 80 serving as a transmit device is used as an example below. An antenna of the transmit device corresponds to M sectors, an antenna of a receive device corresponds to N sectors, where M and N each are a positive integer greater than 1, and M may be equal to or not equal to N. The communication device 80 in this embodiment of this application includes a processing module 801 and a transceiver module 802.

The processing module 801 may be configured to perform the solutions shown in FIG. 2 and FIG. 2-1: performing clear channel assessment on sectors corresponding to the antenna of the transmit device, and specifically, sequentially performing clear channel assessment on all the sectors corresponding to the antenna.

Correspondingly, the transceiver module 802 may be configured to perform the solutions shown in FIG. 2 and FIG. 2-1: sending, in a sector whose result of clear channel assessment performed by the processing module 801 is idle, a training signal to the receive device, where the training signal is used to perform beamforming training on the antenna.

In comparison with an existing mechanism, in this embodiment of this application, the processing module 801 can identify an idle sector by performing the clear channel assessment on the sectors corresponding to the antenna, and sends a training signal in the idle sector. This avoids a prior-art problem that a waiting time is excessively long because a training signal can be sent only when a plurality of sectors of the antenna are all idle. In one aspect, because the idle sector can be detected in a timely manner, resource utilization is increased. In another aspect, because a training signal is preferentially sent in the idle sector when some sectors are occupied, beamforming training efficiency is improved.

Optionally, in some embodiments of this application, to further shorten duration of beamforming training to improve the beamforming training efficiency, before performing the clear channel assessment on the sectors corresponding to the antenna, the processing module 801 is further configured to:

perform clear channel assessment on an omnidirectional channel corresponding to the antenna; and if a result of the clear channel assessment on the omnidirectional channel corresponding to the antenna is busy, perform the clear channel assessment on the sectors corresponding to the antenna.

Optionally, in some embodiments of this application, after duration of the clear channel assessment on the sectors corresponding to the antenna reaches preset duration, the processing module 801 is further configured to:

switch from performing the clear channel assessment on the sectors corresponding to the antenna to performing clear channel assessment on an omnidirectional channel corresponding to the antenna; and when a result of the clear channel assessment on the omnidirectional channel is idle, the transceiver module 802 is further configured to a training signal in a sector in which no training signal has been sent.

Optionally, in some embodiments of this application, a training signal sent in an idle sector carries a first indicator bit, and the first indicator bit is used to indicate a sector identifier of the sector from which the training signal is sent.

Optionally, in some embodiments of this application, the transceiver module 802 is further configured to perform the step in the embodiment shown in FIG. 2-1:

receiving feedback information from the receive device, where the feedback information is generated by the receive device based on a received training signal, and the feedback information carries a sector identifier of a sector with best transmitted signal quality among a sector from which the training signal is sent.

Optionally, in some embodiments of this application, the processing module 801 is further configured to:

when a training signal is sent in a sector whose result of clear channel assessment is idle, count sectors in which no training signal has been sent among the sectors corresponding to the antenna.

Optionally, in some embodiments of this application, a training signal sent in an idle sector carries a second indicator bit, and the second indicator bit is used to indicate a quantity of sectors in which no training signal has been sent among the sectors corresponding to the antenna.

Optionally, in some embodiments of this application, if the transmit device performs clear channel assessment on the sectors corresponding to the antenna, to send a training signal, and the receive device performs clear channel assessment on an omnidirectional channel corresponding to the antenna of the receive device, to receive the training signal, after sending the training signal to the receive device, the transceiver module 802 is further configured to:

send, in the sector with best transmitted signal quality, a training signal to the N sectors, to perform receive beam training or receive beam refinement on the receive device.

Optionally, in some embodiments of this application, if the transmit device performs clear channel assessment on the sectors corresponding to the antenna, to send a training signal, and the receive device performs clear channel assessment on sectors corresponding to the antenna of the receive device, to receive the training signal, the transceiver module 802 is specifically configured to perform the solution shown in FIG. 5:

sequentially sending, in each sector whose result of clear channel assessment is idle, a training signal to the N sectors.

Optionally, in some embodiments of this application, the antenna of the receive device corresponds to N sectors, and after the training signal is sent to the receive device, the processing module 801 is further configured to:

receive, in the sectors corresponding to the antenna, a training signal from the receive device by using the transceiver module 802, and use a sector with best received signal quality as a best receive sector of the antenna of the transmit device. In this way, transmit beam training of the transmit device is completed.

Figure 8:
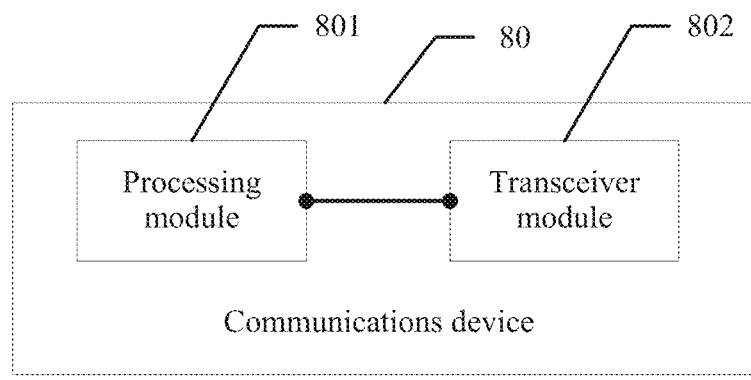
FIG. 8 is a schematic structural diagram of a communication device according to an embodiment of this application.
Figure 9:
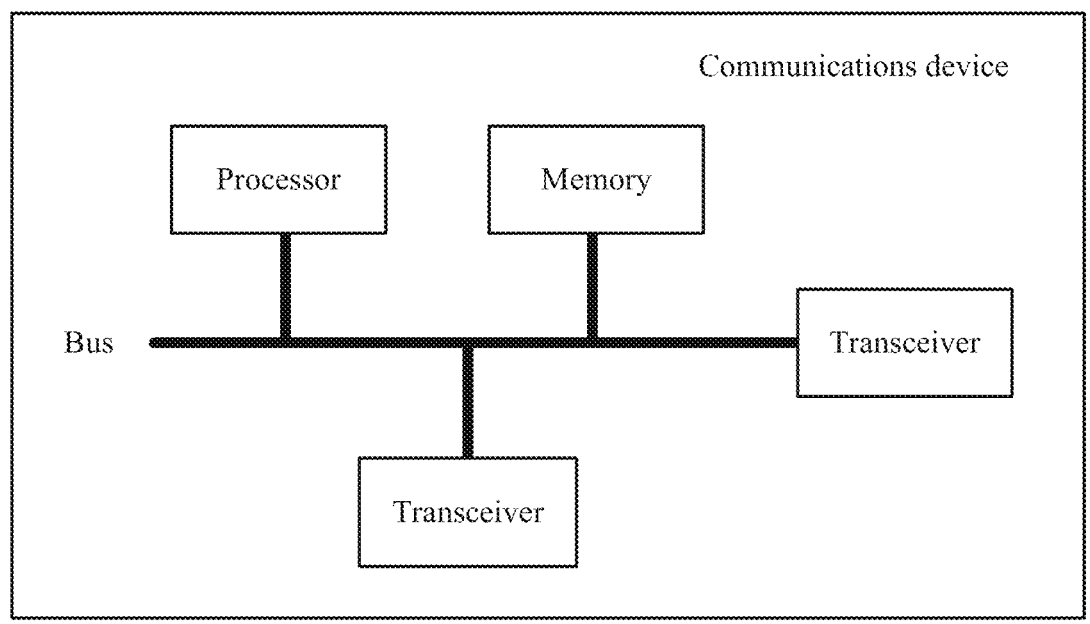
FIG. 9 is a schematic structural diagram of a physical apparatus for performing the foregoing beam training method according to an embodiment of this application.

It should be noted that in the embodiment corresponding to FIG. 8 in this application, a physical device corresponding to the transceiver module may be a transceiver, and a physical device corresponding to the processing module may be a processor. An apparatus shown in FIG. 8 may have a structure shown in FIG. 9. When an apparatus has the structure shown in FIG. 9, a transceiver and a processor in FIG. 9 can implement same or similar functions of the transceiver module and the processing module that are provided in an apparatus embodiment corresponding to the apparatus in the foregoing embodiment.

In the foregoing embodiments, the description of each embodiment has respective focuses. For a part that is not described in detail in an embodiment, refer to related descriptions in other embodiments.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments of this application.

In addition, functional modules in this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The technical solutions provided in this application are described in detail above. The principle and implementation of this application are described in this specification through specific examples. The description about the embodiments is merely provided to help understand the method and core ideas of this application. In addition, a person of ordinary skill in the art can make variations in terms of the specific implementations and application scopes according to the ideas of this application. In conclusion, the content of this specification shall not be construed as a limitation on this application.

What is claimed is:

1. A beam training method, wherein the method comprises:
    performing, by a transmit device, clear channel assessment on sectors corresponding to an antenna of the transmit device; and
    sending, by the transmit device in a sector whose result of clear channel assessment is idle, a training signal to a receive device,
    wherein the training signal is used to perform beamforming training on the antenna, and
    wherein the sending the training signal to the receive device comprises:
        sequentially sending, by the transmit device in each sector whose result of the clear channel assessment indicates that said each sector is idle, the training signal to N sectors corresponding to an antenna of the receive device, wherein N is a positive integer.

2. The method according to claim 1, wherein
before the performing, by the transmit device, the clear channel assessment on the sectors corresponding to the antenna, the method further comprises:
    performing, by the transmit device, clear channel assessment on an omnidirectional channel corresponding to the antenna, and
when a result of the clear channel assessment on the omnidirectional channel corresponding to the antenna is busy, the performing, by the transmit device, the clear channel assessment on the sectors corresponding to the antenna is executed.

3. The method according to claim 1, wherein
after a duration of the clear channel assessment on the sectors corresponding to the antenna reaches a preset duration, the method further comprises:
    switching, by the transmit device, from performing the clear channel assessment on the sectors corresponding to the antenna to performing clear channel assessment on an omnidirectional channel corresponding to the antenna; and
    when a result of the clear channel assessment on the omnidirectional channel is idle, sending, by the transmit device, the training signal in a sector in which no training signal has been sent.

4. The method according to claim 1, wherein
the training signal sent in an idle sector carries a first indicator bit indicating a sector identifier of the idle sector in which the training signal is sent.

5. The method according to claim 4, wherein
the training signal sent in the idle sector further carries a second indicator bit indicating a quantity of sectors in which no training signal has been sent among the sectors corresponding to the antenna.

6. The method according to claim 5, wherein
the performing, by the transmit device, the clear channel assessment on the sectors corresponding to the antenna of the transmit device comprises:
    sequentially performing, by the transmit device, clear channel assessment on all the sectors corresponding to the antenna.

7. The method according to claim 1, wherein
after the sending the training signal to the receive device, the method further comprises:
    sending, by the transmit device in a sector with best transmitted signal quality among the sectors corresponding to the antenna, the training signal N times to the N sectors corresponding to the antenna of the receive device, to perform receive beam training or receive beam refinement on the receive device.

8. The method according to claim 1, wherein after the sending the training signal to the receive device, the method further comprises:
receiving, by the transmit device in the sectors corresponding to the antenna of the transmit device, further training signals from the receive device; and
using, by the transmit device and among the sectors corresponding to the antenna of the transmit device, a sector with best received signal quality as a best receive sector of the antenna of the transmit device.

9. A communication device, wherein the communication device comprises:
a processor configured to perform clear channel assessment on sectors corresponding to an antenna of the communication device; and
a transceiver, wherein, when a result of the clear channel assessment performed by the processor indicates that a sector among the sectors corresponding to the antenna is an idle sector, the transceiver is configured to send, in the idle sector, a training signal to a receive device to perform beamforming training on the antenna,
wherein the training signal sent in the idle sector carries a first indicator bit indicating a sector identifier of the idle sector in which the training signal is sent.

10. The communication device according to claim 9, wherein
before performing the clear channel assessment on the sectors corresponding to the antenna, the processor is further configured to:
perform clear channel assessment on an omnidirectional channel corresponding to the antenna, and
when a result of the clear channel assessment on the omnidirectional channel corresponding to the antenna is busy, the processor is configured to perform the clear channel assessment on the sectors corresponding to the antenna.

11. The communication device according to claim 9, wherein
after a duration of the clear channel assessment on the sectors corresponding to the antenna reaches a preset duration, the processor is further configured to:
switch from performing the clear channel assessment on the sectors corresponding to the antenna to performing clear channel assessment on an omnidirectional channel corresponding to the antenna, and
when a result of the clear channel assessment on the omnidirectional channel is idle, the transceiver is further configured to send the training signal in a sector in which no training signal has been sent.

12. The communication device according to claim 9, wherein
the processor is further configured to:
when the training signal is sent in the idle sector, count sectors in which no training signal has been sent among the sectors corresponding to the antenna.

13. The communication device according to claim 9, wherein
the training signal sent in the idle sector further carries a second indicator bit indicating a quantity of sectors in which no training signal has been sent among the sectors corresponding to the antenna.

14. The communication device according to claim 9, wherein
after sending the training signal to the receive device, the transceiver is further configured to:
send, in a sector with best transmitted signal quality among the sectors corresponding to the antenna, the training signal N times to N sectors corresponding to an antenna of the receive device, to perform receive beam training or receive beam refinement on the receive device, wherein N is a positive integer.

15. The communication device according to claim 9, wherein
the transceiver is further configured to:
sequentially send, in each sector whose result of the clear channel assessment indicates that said each sector is idle, the training signal to N sectors corresponding to an antenna of the receive device, wherein N is a positive integer.

16. The communication device according to claim 15, wherein
after the training signal is sent to the receive device, the processor is further configured to:
receive, in the sectors corresponding to the antenna of the communication device, further training signals from the receive device by using the transceiver, and
use, among the sectors corresponding to the antenna of the communication device, a sector with best received signal quality as a best receive sector of the antenna of the communication device.

17. A chip system, comprising a processor, a memory, and a transceiver, wherein
the memory, the transceiver, and the processor are interconnected by a bus,
the memory stores instructions, and
the instructions are executable by the processor, and instruct the processor to perform the method according to claim 1.

18. A non-transitory computer readable storage medium, comprising instructions which are executable on a computer, and instruct the computer to perform the method according to claim 1.

19. A beam training method, wherein the method comprises:
performing, by a transmit device, clear channel assessment on sectors corresponding to an antenna of the transmit device; and
sending, by the transmit device in a sector whose result of clear channel assessment is idle, a training signal to a receive device, wherein the training signal is used to perform beamforming training on the antenna,
wherein the method further comprises at least one of:
(a) before the performing, by the transmit device, the clear channel assessment on the sectors corresponding to the antenna,
performing, by the transmit device, clear channel assessment on an omnidirectional channel corresponding to the antenna,
wherein when a result of the clear channel assessment on the omnidirectional channel corresponding to the antenna is busy, the performing, by the transmit device, the clear channel assessment on the sectors corresponding to the antenna is executed, or
(b) after a duration of the clear channel assessment on the sectors corresponding to the antenna reaches a preset duration, switching, by the transmit device, from performing the clear channel assessment on the sectors corresponding to the antenna to performing clear channel assessment on an omnidirectional channel corresponding to the antenna, wherein when a result of the clear channel assessment on the omnidirectional channel is idle, sending, by the transmit device, the training signal in a sector in which no training signal has been sent.

20. The method according to claim 19, wherein the training signal sent in an idle sector carries a first indicator bit indicating a sector identifier of the idle sector in which the training signal is sent.

* * * * *